April 7, 1931.  E. J. KROEGER ET AL  1,800,085
PIPE COUPLING
Filed Feb. 28, 1929
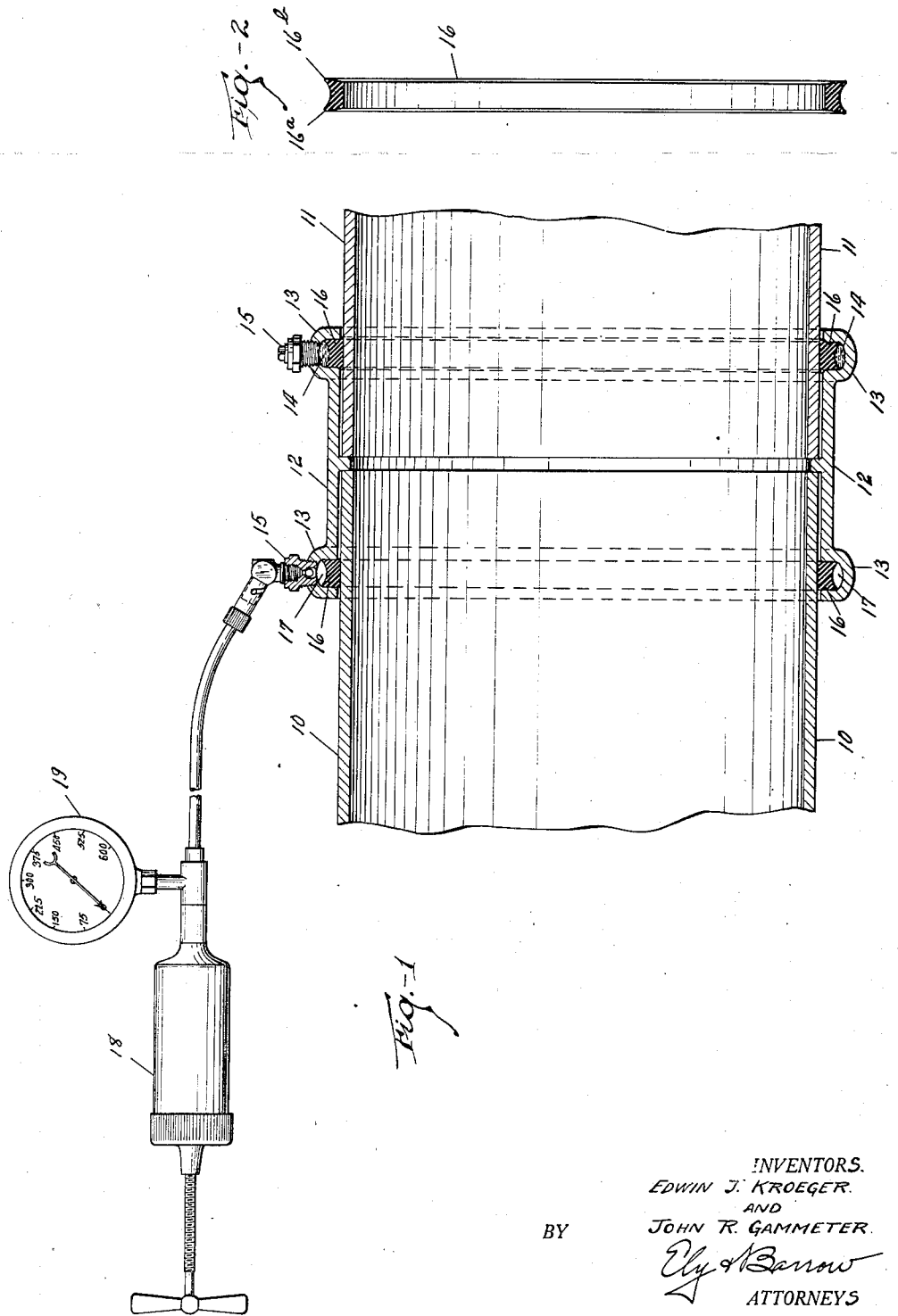
INVENTORS.
EDWIN J. KROEGER.
AND
JOHN R. GAMMETER.
BY
Ely & Barrow
ATTORNEYS Patented Apr. 7, 1931

1,800,085

UNITED STATES PATENT OFFICE

EDWIN J. KROEGER AND JOHN R. GAMMETER, OF AKRON, OHIO; SAID KROEGER ASSIGNOR TO SAID GAMMETER

PIPE COUPLING

Application filed February 28, 1929. Serial No. 343,524.

This invention relates to pipe couplings or joints.

The general purpose of the invention is to provide a pipe coupling or joint having a sealing gasket incorporated therein and initially compressed to seal the joint under pressure of a resilient permanently plastic or fluid pressure medium sealing the joint either against vacuum or high pressures.

A further purpose is to provide a joint as set forth in the preceding paragraph in which the pressure in the line, if higher than the pressure on the medium will be effective on the medium to build up the pressure on the gasket.

A further purpose of the invention is to provide in a joint as described above a gasket capable of being cold set to fill all interstices in the pipe surface, but incapable of cold flow under pressure whereby the seal of the joint cannot be lost by reason of cold flow of the gasket material through the joint.

The foregoing and other purposes are attained in the pipe joint illustrated in the accompanying drawings and described below. It is to be understood that the invention is not limited to the specific form thereof shown and described.

Of the accompanying drawings,

Figure 1 is a diametrial section through a pipe joint embodying the invention;

Figure 2 is a similar section through the gasket used in said joint.

Referring to the drawings, the numerals 10 and 11 denote pipe ends to be joined and the numeral 12 a coupling sleeve embracing both pipe ends.

The sleeve 12 is rolled to the section shown and welded to provide radial channels 13, 13 on the inner periphery thereof to which a plastic or fluid pressure medium 14 may be supplied under pressure through suitable check valves 15, 15.

A rubber gasket 16 is provided for fitting into each channel, said gaskets being of a heavy gravity rubber compound capable of being cold set under pressure and to seal any and all interstices in the pipe against which it is pressed, but not subject to cold flow under pressure whereby the seal could be affected. The term "cold set" as used in the art refers to the quality or property of rubber to set to the shape of confining surfaces when pressure is applied without heat and "cold flow" is that property of rubber, unless especially compounded, to flow while under continuous pressure and in the absence of heat. The gasket is also preferably resistant to gas and oil. A suitable rubber compound for this purpose is obtainable on the market under the trade name Paranite "C".

The gaskets 16 are approximately an eighth of an inch larger in diameter than the pipe, the outer periphery being preferably concave or dished providing lips $16^a$, $16^a$, and are preferably wider at their outer peripheries than the channel. When inserted in the channels, the gaskets are substantially flush with the coupling and leave a space 17 in the channel about the gasket for the reception of the plastic or semi-fluid pressure medium 14.

The pressure medium 14 must be resilient so as to be adapted to follow up all movements, especially lateral movements, of the pipe relative to the joint occasioned by changes in temperature causing expansion and contraction and whipping of pipe lines and this resilience must not depend upon the coefficient of expansion of the pressure medium itself. To this end an aerated pressure medium is employed. This can be accomplished by beating air into the plastic medium prior to forcing it into the joint or by so forcing it into the joint as to trap air therein or both.

A suitable pressure medium for use in joints in oil or gas lines is a semi-fluid mixture of silicate of soda with about 10% asbestos fibre. For water lines, a semi-fluid asphalt or coal tar product similarly aerated may be employed.

In making the joint, the gaskets are folded and permitted to expand into the channel as will be understood, the lips of the gasket being slightly compressed to provide a seal for the space about the gasket, and the medium 14 is forced therein as with a grease gun 18 having a gage 19 thereon preferably until the gage indicates a pressure of six hundred or more pounds. As the rubber cold sets, sealing the interstices about the joint, the pressure gradually drops a hundred or so pounds in two or three hours until the rubber is finally set. The resilient pressure medium then adapts itself to all lateral movements of the pipe and maintains a perfect seal when the pipe shifts longitudinally of the joint expanding and contracting as required and the pressure, of course, varying somewhat.

It has been found that if the pressure in the line becomes higher than the pressure of medium 14, the fluid in the line leaks past the inner face of the gasket and is trapped in the channel by reason of the pressure of the outer face of the gasket on the wall of the channel and thus the pressure on the gasket is always maintained at least as high as the pressure in the line.

The rubber gasket apparently acts in the manner of a piston in the channel, the pressure of the plastic medium in the channel principally applying radial pressure to the sealing face of the gasket, and the sides of the gasket are spread only by the tendency of the rubber to flatten under the radial pressure. Hence the inner line pressure when substantially higher than the pressure in the channel finds a path of least resistance between the side of the gasket at the inner side of the joint and the wall of the channel.

It will be understood that the invention is not limited to the sleeve joint shown, but may be employed in bell and spigot or other joints. It will also be understood that the invention may be embodied in numerous modifications without departing from the spirit thereof or the scope of the appended claims.

What is claimed is:—

1. A pipe joint comprising an outer sleeve for overlapping a pipe end and having an internal circumferential channel in its overlapping end, a resilient gasket positioned in the channel to allow an annular space therein radially outwardly of said gasket, and a resilient fluid pressure medium comprising an aerated permanently plastic or flowable material injected into said space and adapted to be sealed therein under pressure by said gasket for yieldably radially compressing the gasket about the pipe end.

2. A pipe joint comprising an outer sleeve for overlapping a pipe end and being formed in its overlapping end with an internal circumferential channel, a resilient gasket positioned in the channel to allow an annular space therein radially outwardly of said gasket, radial peripheral lips on said gasket, said lips being normally transversely wider than said channel, whereby the gasket will be compressed against the side walls of said channel when the gasket is inserted therein, and a resilient permanently flowable pressure medium comprising an aerated permanently flowable plastic material injected into said annular space and sealed therein under pressure for radially compressing the gasket about the inner sleeve.

3. In a pipe coupling, an outer member adapted to overlap a pipe end and having an inner peripheral channel in the overlapping portion, a gasket of flexible rubber capable of being cold set but not to cold flow under pressure positioned in said channel, and a permanently plastic compressible aerated medium under an initial sealing pressure about the gasket, said gasket being constructed with flat sides engaging the side wall of the channel to permit leakage from the pipe line about its inner side face when the pressure in the line is greater than the pressure in the gasket and adapted to trap said leakage in the channel whereby the pressure on the gasket will build up to the pressure on the line.

EDWIN J. KROEGER.
JOHN R. GAMMETER.